United States Patent [19]

Kobayashi et al.

[11] Patent Number: 6,107,419
[45] Date of Patent: Aug. 22, 2000

[54] PROCESS FOR PREPARATION OF HIGH MOLECULAR WEIGHT EPOXY RESIN

[75] Inventors: Yoshikazu Kobayashi; Takaya Shinmura; Yojiro Yamamoto, all of Yokkaichi, Japan

[73] Assignee: Shell Oil Company, Houston, Tex.

[21] Appl. No.: 08/987,807

[22] Filed: Dec. 10, 1997

[30] Foreign Application Priority Data

Dec. 11, 1996 [JP] Japan .................................. 8-346560

[51] Int. Cl.⁷ .................................................. C08L 63/02
[52] U.S. Cl. .......................... 525/481; 525/523; 525/534; 525/930; 528/87; 528/93; 528/95
[58] Field of Search .................... 525/481, 523, 525/534, 930; 528/87, 93, 95

[56] References Cited

U.S. PATENT DOCUMENTS

| | | | |
|---|---|---|---|
| 3,888,942 | 6/1975 | Tsen | 525/930 |
| 4,104,257 | 8/1978 | Clark . | |
| 4,157,924 | 6/1979 | Elms et al. | 148/6.2 |
| 4,395,574 | 7/1983 | Doorakian et al. | 568/11 |
| 5,070,174 | 12/1991 | Ohba | 525/514 |
| 5,278,259 | 1/1994 | Futakuchi et al. | 525/930 |
| 5,310,854 | 5/1994 | Heinmeyer et al. | 523/400 |
| 5,342,864 | 8/1994 | Craun et al. | 523/403 |
| 5,776,569 | 7/1998 | Cole | 525/529 |

FOREIGN PATENT DOCUMENTS

| | | | |
|---|---|---|---|
| 0055477 | 7/1982 | European Pat. Off. | C08G 59/16 |
| 475359 | 3/1992 | European Pat. Off. | C08G 59/62 |
| 54-05220 | 1/1979 | Japan | F16L 55/18 |
| 55-075460 | 6/1980 | Japan | C08D 3/81 |
| 59-037026 | 9/1984 | Japan | C08D 3/58 |
| 60-144323 | 7/1985 | Japan | C08G 59/62 |
| 60-144324 | 7/1985 | Japan . | |
| 62-007213 | 2/1987 | Japan | C08G 59/20 |
| 04120122 | 4/1992 | Japan | C08G 59/14 |
| 04120124 | 4/1992 | Japan | C08G 59/14 |
| 7-109331 | 4/1995 | Japan | C08G 59/14 |
| WO 95/10556 | 4/1995 | WIPO | C08G 59/06 |

*Primary Examiner*—Robert Dawson
*Assistant Examiner*—D. Aylward

[57] ABSTRACT

Present invention relates to a process for preparing a high molecular weight epoxy resin which has a weight average molecular weight value more than 40,000 and an epoxy equivalent weight less than 10,000 g/eq. This high molecular weight epoxy is prepared by a reaction of a divalent epoxy resin with a bisphenol compound in the presence of a catalyst and a solvent characterized in utilizing 1.10 to 1.03/1 of molar ratio of epoxy group/phenolic hydroxyl group.

10 Claims, No Drawings

PROCESS FOR PREPARATION OF HIGH MOLECULAR WEIGHT EPOXY RESIN

The present invention relates to a high molecular weight epoxy resin which can be employed for coatings, electrically-insulating materials, adhesives, molded articles, and films, and a process for the preparation thereof.

A process which is usually called a two-stage process, which is a process for the preparation of a high molecular weight epoxy resin prepared by a reaction of an epoxy resin having a relatively low molecular weight with a divalent phenol, is known. In JP-B-28004494, a two-stage process in which solvents are not employed in polymerization is disclosed. However, in this document only a polymer having an average molecular weight of approximately 11,000 or so was obtained. On the other hand, processes in which solvents are employed in polymerization are disclosed in, for example, JP-A-54052200, JP-A-60144323, JP-A-60144324, JP-A-04120122, JP-A-04120124, and JP-A-07109331. In the latter document, although high molecular weight epoxy resins are obtained, having a relatively broad molecular weight distribution (Mw/Mn in the range of from 4 to 11) the concentration of epoxy groups in the epoxy resins was actually unspecified, and it is negligibly low if experimentally verified.

That is, it appeared to be still impossible to obtain a high molecular weight epoxy resin, having a sufficient concentration of epoxy groups, by the conventional processes for the preparation of a high molecular weight epoxy resin. Among the high molecular weight epoxy resins, a so-called phenoxy resin is the commercially supplied epoxy resin which has an elevated degree of polymerization with a molecular weight of not less than 40,000 and a negligibly low concentration of epoxy groups.

The phenoxy resin has properties such as a thermoplastic resin. Although it can be employed solely as a coating layer or a molded article, it is usually employed as a thermosetting resin with an amino resin, a resol, and an isocyanate which are a curing agent by a cross-linking reaction in which hydroxyl groups being present as side chains in the resin are utilized. Cured article has excellent properties, and it is particularly more excellent in flexibility, processability, and impact resistance compared to a cured article of a low molecular weight epoxy resin. However, since a conventional phenoxy resin does not basically contain any epoxy group, the properties cannot be improved by a variety of modification in which epoxy groups are utilized as reaction points, resulting in that adhesion and corrosion resistance are poor.

As a specific example of the modification in which epoxy groups are utilized as reactive sites, there is exemplified a water-based epoxy/acrylic coating. As processes disclosed until now, there are (1) a water-based coating (e.g. JP-B-84037026) in which an esterification of an epoxy resin with an acrylic resin, having carboxylic group, which is obtained by copolymerization of one or more kinds of a vinyl monomer having carboxylic group such as acrylic acid or methacrylic acid, etc. with one or more kinds of a styrene-based monomer such as styrene and vinyl toluene, an acrylic monomer such as methyl acrylate and ethyl acrylate, a methacrylate monomer such as methyl methacrylate and ethyl methacrylate, a monomer having hydroxyl group such as 2-hydroxyethyl acrylate and hydroxypropyl methacrylate, and an N-substituted(meth)acrylic monomer such as N-methylol(meth)acrylamide and N-butoxymethyl(meth) acrylamide, and then excessive carboxylic groups are neutralized by bases, followed by being dispersed into water, and (2) a water-based coating (e.g. JP-B-87007213) in which an epoxy resin is partially esterified with acrylic acid and/or methacrylic acid to introduce acryloyl groups, and then it is copolymerized with a mixture composed of the same vinyl monomers as in the (1) containing acrylic acid and/or methacrylic acid, followed by being dispersed into water by the same method as in the (1).

The esterification reaction in (1) basically depends upon a reaction of epoxy groups in the epoxy resin with carboxylic groups in the acrylic resin, and in (2) is the same. Although the epoxy resin employed herein has a weight average molecular weight of 5,000 to 30,000 or so, there is still desired an epoxy resin having a sufficient concentration of epoxy groups together with a higher molecular weight in order to improve properties. Also in other uses, there is becoming required a high molecular weight epoxy resin which can afford a cross-linking reaction utilizing epoxy groups, or a variety of modifications utilizing epoxy groups as reacting points.

In the case that a low molecular weight epoxy resin is employed, although corrosion resistance is improved owing to sufficient adhesion and cross-linking density due to epoxy groups and hydroxyl groups generated by cross-linking reaction, worse flexibility, processability, and impact resistance are obtained. Also, in the case that a phenoxy resin is employed, although there are improved flexibility processability, and impact resistance, in contrary, it has been problematic that adhesion and corrosion resistance become worse.

Problem to be solved by the present invention is to provide a high molecular weight epoxy resin which has a same molecular weight as that of a conventional phenoxy resin, but having a narrow molecular weight distribution $$\left(\frac{Mw}{Mn} < 4 \text{ and preferably} < 3\right)$$

and having a sufficient concentration of epoxy groups to be required for obtaining a cured article which is excellent in adhesion, corrosion resistance, flexibility, processability, and impact resistance, and to provide process for the preparation thereof.

Accordingly, the present invention relates to a process for the preparation of a high molecular weight epoxy resin having a weight average molecular weight of not less than 40,000 and an epoxy equivalent of not more than 10,000 g/eq, by thermally polymerizing an epoxy resin (A) and a divalent phenol (B) in a reaction solvent under the presence of a catalyst, characterized in that the mixing ratio by equivalent of said epoxy resin (A) with respect to said divalent phenol (B) is 1.10 to 1.03:1, based on an epoxy group/a phenolic hydroxyl group.

More in particular the present invention relates to a process for the preparation of a high molecular weight epoxy resin, wherein said epoxy equivalent in the high molecular weight epoxy resin ranges from 4,000 g/eq to 10,000 g/eq, and to an epoxy resin, having a molecular weight of not less than 40,000 and an epoxy equivalent in the range of from 4,000 to 10,000 g/eq.

The epoxy resin (A) has an epoxy equivalent ranging from 100 g/eq to 1,000 g/eq and preferably from 150 to 250 g/eq.

According to a preferred embodiment of the process of the present invention the epoxy resin (A) is a bisphenol type epoxy resin.

According to another preferred embodiment of the present process, the divalent phenol (B) has a carbon number of 6 to 30.

According to another preferred embodiment of the process of the present invention the divalent phenol (B) is bisphenol.

According to another preferred embodiment of the process of the present invention either an aromatic-based solvent or a ketone based solvent or an amide based solvent or a glycol ether based solvent is employed as the reaction solvent and the process is carried out in a solid concentration of 95% by weight to 50% by weight in the reaction solvent.

The epoxy resin (A) to be employed in the present invention may be any compounds having at least two epoxy groups in the molecule. For example, there are exemplified a bisphenol A type epoxy resin, a bisphenol F type epoxy resin, a tetrabromo bisphenol A type epoxy resin, a biphenol type epoxy resin, an alicyclic epoxy resin, a diglycidylether of a divalent phenol having a single ring, such as catechol, resorcin, and hydroquinone, etc., and a polyglycidylester of a polycarboxylic acid such as phthalic acid, isophthalic acid, and a dimer acid, etc. Also, there are exemplified the compounds substituted by non-interfering substituent groups such as a halogen, an alkyl group, an aryl group, an ether group, and an ester group. Of the epoxy resins, the diglycidylether of a divalent phenol is preferred, and the diglycidylether of bisphenol is more preferred. Although a molecular weight in the epoxy resins is not limited, an epoxy resin, having epoxy equivalent ranging from 100 to 1,000 g/eq is preferred from a viewpoint of easy handling due to a low viscosity and a high purity of terminal groups. More preferably an epoxy resin having an epoxy equivalent ranging from 150 to 250 g/eq is used. Further, a plurality of the epoxy resins may be employed together. In the case that the epoxy equivalent is not more than 100 g/eq, the concentration of functional groups is excessively high, unpreferably resulting in that gelation is readily caused because of side reactions such as a branching reaction, and in the case that it is not less than 1,000 g/eq, the purity of the terminal groups is excessively low, unpreferably resulting in that a molecular weight is not sufficiently increased.

The divalent phenol (B) to be employed in the present invention may be any compounds in which two hydroxyl groups are connected to an aromatic ring. For example, there are exemplified bisphenol A, bisphenol F, tetrabromo bisphenol A, bisphenol S, bisphenol B, bisphenol AD, biphenol, catechol, resorcin, hydroquinone, 1,6-naphthalenediol, and 2,7-naphthalenediol.

Also, there are exemplified the compounds substituted by non-interfering substituent groups such as a halogen, an alkyl group, an aryl group, an ether group, and an ester group. Of the compounds, there is preferred a divalent phenol having a carbon number of 6 to 30. In the case that the divalent phenol has a carbon number of not more than 6, sufficiently attractive properties cannot be obtained and, in the case of not less than 30, handling is unpreferably difficult because of a high viscosity. The bisphenols are particularly preferred. Further, a plurality of the divalent phenols may be employed together.

More preferably divalent phenols are employed having a phenolic hydroxyl group equivalent in the range of from 100 to 130 g/eq.

As conditions for the preparation in the present invention, the epoxy resin (A) and the divalent phenol (B) are preferably mixed in an equivalent ratio of 1.10 to 1.03:1 based on an epoxy group/a phenolic hydroxyl group. In the case that the equivalent ratio is not less than 1.10, a molecular weight cannot be increased and, in the case of not more than 1.03, the concentration of epoxy groups cannot be sufficiently obtained.

The catalyst in the present invention may be any compounds having a catalytic property capable of making the reaction of epoxy groups with hydroxyl groups proceed. For example, alkali metal compounds, organic phosphorus compounds, tertiary amines, salts of quaternary ammonium, and imidazoles can be used, and preferably alkali metal compounds and salts of quaternary ammonium. The latter group is more preferred.

Suitable examples of the alkali metal compounds include sodium hydroxide, lithium hydroxide, potassium hydroxide, sodium carbonate, sodium bicarbonate, lithium chloride, sodium methoxide, sodium ethoxide, lithium methoxide, lithium ethoxide, sodium hydride, and sodium amide, etc.

Suitable examples of the salts of quaternary ammonium include tetramethylammonium chloride, tetramethylammonium bromide, tetramethylammonium hydroxide, tetraethylammonium chloride, tetraethylammonium bromide, tetra-n-butylammonium chloride, tetra-n-butylammonium chloride, tetra-n-butylammonium bromide, tetra-n-butylammonium hydroxide, benzyltrimethyl ammonium chloride, benzyltrimethyl ammonium bromide, and benzyltrimethyl ammonium hydroxide, etc. Suitable examples of the imidazoles include 2-methylimidazole, 2-ethyl-4-methylimidazole, and 2-phenylimidazole, etc. The catalysts may be employed together. The use amount of the catalyst is generally 0.001 to 10% by weight, preferably 0.005 to less than 1% by weight based on solid components in the reaction.

Most preferred catalysts are selected from tetramethylammonium chloride, tetramethylammonium hydroxide and sodium hydroxide.

The solvent in the present invention may be any compounds capable of dissolving the epoxy compound and the phenol compound which are raw materials. For example, there are exemplified aromatic-based solvents, ketone-based solvents, amide-based solvents, and glycolether-based solvents, etc. Specific examples of the aromatic-based solvents include benzene, toluene, and xylene, etc.

Specific examples of the ketone-based solvents include methylethyl ketone, methylisobutyl ketone, 2-heptanone, 4-heptanone, 2-octanone, cyclohexanone, and acetylacetone, etc.

Specific examples of the amide-based solvents include formamide, N-methylformamide, N,N-dimethylformamide, acetamide, N-methylacetamide, N,N-dimethylacetamide, 2-pyrrolidone, and N-methylpyrrolidone, etc. Specific examples of the glycolether-based solvents include ethyleneglycol monomethylether, ethyleneglycol monoethylether, ethyleneglycol mono-n-butylether, ethyleneglycol dimethylether, ethyleneglycol monoethylether acetate, diethyleneglycol monomethylether, diethyleneglycol monoethylether, diethyleneglycol mono-n-butylether, diethyleneglycol dimethylether, diethyleneglycol monoethylether acetate, propyleneglycol monomethylether, propyleneglycol mono-n-butylether, and propyleneglycol monomethylether acetate, etc.

Preferred solvents to be used are selected from xylene, cyclohexanone, methyl ethyl ketone, methyl isobutyl ketone, dimethylacetamide, ethyleneglycol monobutyl ether, diethylene glycol mono-n-butyl ether and propylene glycol monomethylether acetate.

The solvents may be employed together. The concentration of solid components in synthetic reaction for the preparation is preferably in the range of from 50% to 95% and more preferably from 70 to 95% wt. Further, in the case that a high viscous product is produced halfway in the reaction, the reaction can be continued by the addition of the solvents.

In the case that the concentration of solid components is not more than 50% by weight, polymerization reaction is slow, and a molecular weight does not sufficiently increase and, in the case of not less than 90% by weight, it is difficult to handle because of a high viscosity, and side reactions are frequently caused, unpreferably resulting in that a molecular weight in a polymer does not linearly increase.

In the present invention, the polymerization reaction is carried out at a reaction temperature to an extent in which solvents to be employed are not decomposed. The reaction temperature ranges from 50 to 230° C. and preferably from 100 to 200° C. and more preferably from 130 to 180° C. In the case of not more than 50° C., the polymerization reaction is remarkably slow, and a molecular weight dose not sufficiently increase and, in the case of not less than 230° C., side reactions are frequently caused, unpreferably resulting in that a molecular weight does not linearly increase. In the case that there is employed a solvent having a low boiling point such as methylethylketone, the reaction temperatures can be kept by carrying out the reaction under a high pressure using an autoclave.

Polymerization reaction times normally vary from 3 to 12 hrs and are preferably in the range from 5 to 10 hrs.

A desired high molecular weight epoxy resin can be obtained by the above-mentioned reaction conditions. In the case that epoxy equivalent in the high molecular weight epoxy resin is not more than 4,000 g/eq, it is occasionally insufficient in flexibility, processability, and impact resistance and, in the case of exceeding 10,000 g/eq, there cannot be carried out the modification in which epoxy groups are utilized as the reaction points, resulting in that adhesion and corrosion resistance are occasionally insufficient. Accordingly, it is preferably 4,000 to 10,000 g/eq.

The epoxy resin obtained by the present invention can be used in various applications such as coatings, electrical insulation, and adhesives, and especially has excellent properties for the waterborne can coatings application.

The present invention is further illustrated by the following Examples, however, without restricting its scope to these embodiments.

EXAMPLE 1

A reaction vessel was charged with 539 parts by weight of a bisphenol A type epoxy resin (an epoxy equivalent: 186 g/eq), 311 parts by weight of bisphenol A (a phenolic hydroxyl group equivalent: 114 g/eq, the mixing ratio by equivalent: epoxy group/phenolic hydroxyl group=1.06/1.00), 150 parts by weight of xylene, 2.2 parts by weight of 50% by weight of aqueous solution of tetramethylammonium chloride as a catalyst, followed by carrying out a polymerization reaction at 155° C. for 5 hours under an atmosphere of nitrogen gas. Weight average molecular weight of a resin obtained was 42,400 based on a Polystyrene as a result of a measurement with a gel-permeation chromatography, and an epoxy equivalent was 7,100 g/eq.

COMPARATIVE EXAMPLE 1

The same polymerization reaction as in Example 1 was followed except that the mixing ratio in Example 1 was changed to 548 parts by weight in the bisphenol A type epoxy resin (an epoxy equivalent: 186 g/eq) and 302 parts by weight in bisphenol A (a phenolic hydroxyl group equivalent: 114 g/eq, the mixing ratio by equivalent: epoxy group/phenolic hydroxyl group=1.11/1.00). Weight average molecular weight of a resin obtained was 29,100 based on a Polystyrene as a result of a measurement with a gel-permeation chromatography, and an epoxy equivalent was 4,980 g/eq. Compared to the resin in Example 1, the weight average molecular weight is low, and the epoxy equivalent is also low.

EXAMPLE 2

A reaction vessel was charged with 378 parts by weight of a bisphenol A type epoxy resin (an epoxy equivalent: 186 g/eq), 222 parts by weight of bisphenol A (a phenolic hydroxyl group equivalent: 114 g/eq, the mixing ratio by equivalent: epoxy group/phenolic hydroxyl group=1.04/1.00), 400 parts by weight of cyclohexanone, 1.8 parts by weight of 29 wt %-aqueous solution of tetramethylammonium hydroxide as a catalyst, followed by carrying out a polymerization reaction at 140° C. for 9 hours under an atmosphere of nitrogen gas. Weight average molecular weight of a resin obtained above was 52,200 based on a Polystyrene as a result of a measurement with a gel-permeation chromatography, and an epoxy equivalent was 9,850 g/eq.

COMPARATIVE EXAMPLE 2

The same polymerization reaction as in Example 2 was followed except that the mixing ratio in Example 2 was changed to 375 parts by weight of the bisphenol A type epoxy resin (an epoxy equivalent: 186 g/eq) and 225 parts by weight of bisphenol A (a phenolic hydroxyl group equivalent: 114 g/eq, the mixing ratio by equivalent: epoxy group/phenolic hydroxyl group=1.02/1.00). Weight average molecular weight of a resin obtained was 56,200 based on a Polystyrene as a result of a measurement with a gel-permeation chromatography, and an epoxy equivalent was 16,300 g/eq. Compared to the resin in Example 2, the weight average molecular weight is low, and the epoxy equivalent is also low.

EXAMPLE 3

A reaction vessel was charged with 474 parts by weight of the bisphenol A type epoxy resin (an epoxy equivalent: 186 g/eq), 276 parts by weight of bisphenol A (a phenolic hydroxyl group equivalent: 114 g/eq, the mixing ratio by equivalent: epoxy group/phenolic hydroxyl group=1.05/1.00), 250 parts by weight of cyclohexanone, 1.3 parts by weight of 29 wt %-aqueous solution of tetramethylammonium hydroxide as a catalyst, followed by carrying out a polymerization reaction at 140° C. for 6 hours under an atmosphere of nitrogen gas. Weight average molecular weight of a resin obtained was 48,500 based on a Polystyrene as a result of a measurement with a gel-permeation chromatography, and an epoxy equivalent was 8,060 g/eq.

COMPARATIVE EXAMPLE 3

The same polymerization reaction as in Example 3 was followed except that the mixing ratio in Example 2 was changed to 465 parts by weight of the bisphenol A type epoxy resin (an epoxy equivalent: 186 g/eq) and 285 parts by weight of bisphenol A (a phenolic hydroxyl group equivalent: 114 g/eq, the mixing ratio by equivalent: epoxy group/phenolic hydroxyl group=1.00/1.00). Weight average molecular weight of a resin obtained was 58,000 based on a Polystyrene as a result of a measurement with a gel-permeation chromatography, and an epoxy equivalent was 24,600 g/eq. Compared to the resin in Example 3, the weight average molecular weight is low, and the epoxy equivalent is also low.

EXAMPLE 4

A reaction vessel was charged with 479 parts by weight of a bisphenol F type epoxy resin (an epoxy equivalent: 168 g/eq), 271 parts by weight of bisphenol F (a phenolic hydroxyl group equivalent: 100 g/eq, the mixing ratio by equivalent: epoxy group/phenolic hydroxyl group=1.05/1.00), 250 parts by weight of methylethylketone, 1.7 parts by weight of 29 wt %-aqueous solution of tetramethylammonium hydroxide as a catalyst, followed by carrying out a polymerization reaction at 135° C. for 7 hours under an atmosphere of nitrogen gas. Weight average molecular weight of a resin obtained was 59,300 based on a Polystyrene as a result of a measurement with a gel-permeation chromatography, and an epoxy equivalent was 8,960 g/eq.

COMPARATIVE EXAMPLE 4

The same polymerization reaction as in Example 4 was followed except that the mixing ratio in Example 4 was changed to 472 parts by weight of the bisphenol F type epoxy resin (an epoxy equivalent: 186 g/eq) and 278 parts by weight of bisphenol F (a phenolic hydroxyl group equivalent: 100 g/eq, the mixing ratio by equivalent: epoxy group/phenolic hydroxyl group=1.01/1.00). Weight average molecular weight of a resin obtained was 65,600 based on a Polystyrene as a result of a measurement with a gel-permeation chromatography, and an epoxy equivalent was 24,600 g/eq. Compared to the resin in Example 4, the weight average molecular weight is low, and the epoxy equivalent is also low.

EXAMPLE 5

A reaction vessel was charged with 496 parts by weight of a bisphenol A type epoxy resin (an epoxy equivalent: 186 g/eq), 254 parts by weight of bisphenol F (a phenolic hydroxyl group equivalent: 100 g/eq, the mixing ratio by equivalent: epoxy group/phenolic hydroxyl group=1.05/1.00), 250 parts by weight of methylisobutylketone, 1.2 parts by weight of 29 wt %-aqueous solution of tetramethylammonium hydroxide as a catalyst, followed by carrying out a polymerization reaction at 130° C. for 7.5 hours under an atmosphere of nitrogen gas. Weight average molecular weight of a resin obtained was 54,100 based on a Polystyrene as a result of a measurement with a gel-permeation chromatography, and an epoxy equivalent was 8,020 g/eq.

COMPARATIVE EXAMPLE 5

The same polymerization reaction as in Example 5 was followed except that the mixing ratio in Example 5 was changed to 489 parts by weight of the bisphenol A type epoxy resin (an epoxy equivalent: 186 g/eq) and 261 parts by weight of bisphenol F (a phenolic hydroxyl group equivalent: 100 g/eq, the mixing ratio by equivalent: epoxy group/phenolic hydroxyl group=1.01/1.00). Weight average molecular weight of a resin obtained was 61,400 based on a Polystyrene as a result of a measurement with a gel-permeation chromatography, and an epoxy equivalent was 20,200 g/eq. Compared to the resin in Example 5, the weight average molecular weight is low, and the epoxy equivalent is also low.

EXAMPLE 6

A reaction vessel was charged with 507 parts by weight of a bisphenol A type epoxy resin (an epoxy equivalent: 168 g/eq), 293 parts by weight of bisphenol A (a phenolic: hydroxyl group equivalent: 114 g/eq, the mixing ratio by equivalent: epoxy group/phenolic hydroxyl group=1.06/1.00), 200 parts by weight of dimethylacetamide, 0.8 part by weight of 20 wt %-aqueous solution of sodium hydroxide as a catalyst, followed by carrying out a polymerization reaction at 175° C. for 6 hours under an atmosphere of nitrogen gas. Weight average molecular weight of a resin obtained above was 46,900 based on a Polystyrene as a result of a measurement with a gel-permeation chromatography, and an epoxy equivalent was 8,580 g/eq.

COMPARATIVE EXAMPLE 6

The same polymerization reaction as in the Example 6 was followed except that the mixing ratio in the Example 6 was changed to 515 parts by weight of a bisphenol A type epoxy resin (an epoxy equivalent: 186 g/eq) and 285 parts by weight to bisphenol A (a phenolic hydroxyl group equivalent: 114 g/eq, the mixing ratio by equivalent: epoxy group/phenolic hydroxyl group=1.11/1.00). Weight average molecular weight of a resin obtained was 31,800 based on a Polystyrene as a result of a measurement with a gel-permeation chromatography, and an epoxy equivalent was 5,200 g/eq. Compared to the resin in the Example 6, the weight average molecular weight is low, and the epoxy equivalent is also low.

EXAMPLE 7

A reaction vessel was charged with 617 parts by weight of a bisphenol A type epoxy resin (an epoxy equivalent: 186 g/eq), 313 parts by weight of bisphenol F (a phenolic hydroxyl group equivalent: 100 g/eq, the mixing ratio by equivalent: epoxy group/phenolic hydroxyl group=1.06/1.00), 70 parts by weight of ethyleneglycolmonobutyl ether, 1.4 part by weight of 50 wt %-aqueous solution of tetramethylammonium chloride as a catalyst, followed by carrying out a polymerization reaction at 195° C. for 5 hours under an atmosphere of nitrogen gas. Weight average molecular weight of a resin obtained above was 51,400 based on a Polystyrene as a result of a measurement with a gel-permeation chromatography, and an epoxy equivalent was 9,350 g/eq.

COMPARATIVE EXAMPLE 7

The same polymerization reaction as in the Example 7 was followed except that the mixing ratio in the Example 7 was changed to 609 parts by weight of a bisphenol A type epoxy resin (an epoxy equivalent: 186 g/eq) and 321 parts by weight of bisphenol F (a phenolic hydroxyl group equivalent: 100 g/eq, the mixing ratio by equivalent: epoxy group/phenolic hydroxyl group 1.02/1.00). Weight average molecular weight of a resin obtained was 53,000 based on a Polystyrene as a result of a measurement with a gel-permeation chromatography, and an epoxy equivalent was 28,800 g/eq. Compared to the resin in the Example 7, the weight average molecular weight is low, and the epoxy equivalent is also low.

EXAMPLE 8

A reaction vessel was charged with 509 parts by weight of a bisphenol A type epoxy resin (an epoxy equivalent: 168 g/eq), 291 parts by weight of bisphenol A (a phenolic hydroxyl group equivalent: 114 g/eq, the mixing ratio by equivalent: epoxy group/phenolic hydroxyl group=1.07/1.00), 200 parts by weight of diethyleneglycol mono-n-butylether, 1.2 part by weight of 29 wt %-aqueous solution of tetramethylammonium hydroxide as a catalyst, followed by carrying out a polymerization reaction at 140° C. for 6 hours under an atmosphere of nitrogen gas. Weight average molecular weight of a resin obtained above was 43,100 based on a Polystyrene as a result of a measurement with a gel-permeation chromatography, and an epoxy equivalent was 9,810 g/eq.

COMPARATIVE EXAMPLE 8

The same polymerization reaction as in the Example 8 was followed except that the mixing ratio in the Example 8 was changed to 500 parts by weight of a bisphenol A type epoxy resin (an epoxy equivalent: 186 g/eq) and 300 parts by weight of bisphenol A (a phenolic hydroxyl group equivalent: 114 g/eq, the mixing ratio by equivalent: epoxy group/phenolic hydroxyl group=1.02/1.00). Weight average molecular weight of a resin obtained was 44,500 based on a Polystyrene as a result of a measurement with a gel-permeation chromatography, and an epoxy equivalent was 31,300 g/eq. Compared to the resin in the Example 8, the weight average molecular weight is low, and the epoxy equivalent is also low.

EXAMPLE 9

A reaction vessel was charged with 514 parts by weight of a bisphenol F type epoxy resin (an epoxy equivalent: 186 g/eq), 286 parts by weight of bisphenol F (a phenolic hydroxyl group equivalent: 100 g/eq, the mixing ratio by equivalent: epoxy group/phenolic hydroxyl group=1.07/1.00), 200 parts by weight of propyleneglycol monomethylether acetate, 1.9 part by weight of 29 wt %-aqueous solution of tetramethylammonium hydroxide as a catalyst, followed by carrying out a polymerization reaction at 140° C. for 8 hours under atmosphere of nitrogen gas. Weight average molecular weight of a resin obtained was 53,300 based on a Polystyrene as a result of a measurement with a gel-permeation chromatography, and an epoxy equivalent was 7,930 g/eq.

COMPARATIVE EXAMPLE 9

The same polymerization reaction as in the Example 9 was followed except that the mixing ratio in the Example 9 was changed to 505 parts by weight of a bisphenol F type epoxy resin (an epoxy equivalent: 186 g/eq) and 295 parts by weight of bisphenol F (a phenolic hydroxyl group equivalent: 100 g/eq, the mixing ratio by equivalent: epoxy group/phenolic hydroxyl group=1.02/1.00). Weight average molecular weight of a resin obtained was 57,000 based on a Polystyrene as a result of a measurement with a gel-permeation chromatography, and an epoxy equivalent was 37,900 g/eq. Compared to the resin in the Example 9, the weight average molecular weight is low, and the epoxy equivalent is also low.

COMPARATIVE EXAMPLE 10

As a result of analysis relating to a phenoxy resin YP50P manufactured by Toto Kasei, Co. Ltd., a weight average molecular weight was 69,000 based on a Polystyrene as a result of a measurement with a gel-permeation chromatography, and an epoxy equivalent was 114,000 g/eq.

COMPARATIVE EXAMPLE 11

As a result of analysis relating to a phenoxy resin PKHH manufactured by Union Carbide Chem. Ltd., a weight average molecular weight was 49,900 based on a Polystyrene as a result of a measurement with a gel-permeation chromatography, and an epoxy equivalent was 57,200 g/eq.

Analytical methods in the above Examples and Comparative Examples are shown below in detail. Apparatuses employed in the gel-permeation chromatography are HLC-8120GPC, SC-8020, and UV-8020 manufactured by Toso, Ltd., and columns employed are TSKgel SuperHM-H+SuperH4000+SuperH4000+SuperH3000+SuperH2000 manufactured by Toso, Ltd. Tetrahydrofuran was employed as an eluent. Weight average molecular weight based on a Polystyrene is a molecular weight calculated from an elution time after calibrating a relationship between a molecular weight and an elution time using standard Polystyrenes having a variety of molecular weight. Epoxy equivalent was measured by a potentiometric titration method. Approximately 7 g of a sample was weighed into a beaker, and then 80 ml of dichlorometane was added to dissolve, and further 20 ml of acetic acid and 2 g of cetyltrimethylammonium bromide were dissolved to obtain a solution. Subsequently, the solution was titrated with 0.1 normal acetic acid solution of perchloric acid while agitating to measure an epoxy equivalent.

PREPARATION EXAMPLE 1 FOR EVALUATION

A reaction vessel was charged with 500 parts by weight of the epoxy resin obtained in the Example 3 and 500 parts by weight of ethyleneglycol-n-monobutylether to completely dissolve at 120° C. under a nitrogen stream, and there was obtained an epoxy resin solution (a) having the resin content of 50%.

PREPARATION EXAMPLE 2 FOR EVALUATION

A reaction vessel was charged with 500 parts by weight of the epoxy resin obtained in the Example 5 and 500 parts by weight of ethyleneglycol-n-monobutylether to completely dissolve at 120° C. under a nitrogen stream, and there was obtained an epoxy resin solution (b) having the resin content of 50%.

PREPARATION EXAMPLE 3 FOR EVALUATION

A reaction vessel was charged with 500 parts by weight: of the epoxy resin obtained in the Comparative Example 1 and 500 parts by weight of ethyleneglycol-n-monobutylether to completely dissolve at 120° C. under a nitrogen stream, and there was obtained an epoxy resin solution (c) having the resin content of 50%.

PREPARATION EXAMPLE 4 FOR EVALUATION

A reaction vessel was charged with 500 parts by weight of the phenoxy resin PKHH (manufactured by Union Carbide Chem. Ltd.) in the Comparative Example 11 and 500 parts by weight of ethyleneglycol-n-monobutylether to completely dissolve at 120° C. under a nitrogen stream, and there was obtained an epoxy resin solution (d) having the resin content of 50%.

PREPARATION EXAMPLE 5 FOR EVALUATION

A four-necked flask was charged with 250 parts by weight of n-butylalcohol, 130 parts by weight of ethyleneglycol-n-monobutylether to completely dissolve at 105° C. under a nitrogen stream, and there was added dropwise a mixed solution composed of 220 parts by weight of methacrylic acid, 200 parts by weight of styrene, 180 parts by weight of ethyl acrylate, and 20 parts by weight of benzoylperoxide over 3 hours at 105° C., followed by further maintaining the temperature for 2 hours to obtain a solution (e) of an acrylic-based resin having carboxylic groups having the resin content of 60%.

PREPARATION EXAMPLE 6 FOR EVALUATION

A four-necked flask was charged with 480 parts by weight of bisphenol A, 480 parts by weight of 37%-formalin aqueous solution, and 40 parts by weight of 25%-aqueous ammonia to allow to react at 90° C. under a nitrogen stream for 4 hours, and there were added a mixture of methylisobutylketone/xylene/n-butylalcohol/cyclohexanone=1/1/1/1 and water to extract, and further there was carried out an azeotropic distillation to obtain a solution (f) of a resol type phenol resin having the resin content of 40%.

Evaluation Example 1

| | | |
|---|---|---|
| (1) | epoxy resin solution (a) | 375.0 parts by weight |
| (2) | solution (e) of an acrylic-based resin having carboxylic groups | 83.3 parts by weight |
| (3) | dimethylaminoethanol | 19.0 parts by weight |
| (4) | solution (f) of a resol type phenol resin | 31.3 parts by weight |
| (5) | ion-exchanged water | 491.4 parts by weight |

(1) and (2) were charged into a reaction vessel, followed by being heated to 100° C. to dissolve both resins under a nitrogen stream. Successively, (3) was added and agitated for 2 hours at 100° C., followed by being cooled to 50° C. And then, (4) was added and further (5) was added over 1 hour to obtain a water-based coating containing solid components of 25%. The weight ratio of the solid components is the epoxy resin/the acrylic resin/the resol type phenol resin= 75/20/5.

EVALUATION EXAMPLE 2

The same procedures as in the Evaluation Example 1 were followed except that the epoxy resin solution (b) was employed in place of the epoxy resin solution (a) in the Evaluation Example 1 to obtain a water-based coating having solid components of 25%. The weight ratio of the solid components is the epoxy resin/the acrylic resin/the resol type phenol resin=75/20/5.

EVALUATION EXAMPLE 3 (FOR A REFERENCE)

The same procedures as in the Evaluation Example 1 were followed except that the epoxy resin solution (c) was employed in place of the epoxy resin solution (a) in the Evaluation Example 1 to obtain a water-based coating having solid components of 25%. The weight ratio of the solid components is the epoxy resin/the acrylic resin/the resol type phenol resin=75/20/5.

EVALUATION EXAMPLE 4 (FOR A REFERENCE)

The same procedures as in the Evaluation Example 1 were followed except that the phenoxy resin solution (d) was employed in place of the epoxy resin solution (a) in the Evaluation Example 1 to obtain a water-based coating having solid components of 25%. The weight ratio of the solid components is the phenoxy resin/the acrylic resin/the resol type phenol resin=75/20/5.

The water-based coatings obtained in the above-mentioned Evaluation Examples 1 to 4 were adjusted by removal in a reduced pressure so that the content of organic solvents becomes 15% in the coatings having solid components of 25%.

In relation to the water-based coatings obtained in the above-mentioned Evaluation Examples 1 to 4, storage stability of the coatings, adhesion of coating layers, water resistance, corrosion resistance, and processability were tested according to the testing methods as described below. Test results are shown in Table 1.

TABLE 1

| | Storage stability | Adhesion | Water resistance | Corrosion resistance | Processability |
|---|---|---|---|---|---|
| Evaluation Example 1 | o | 100/100 | o | o | 0.42 mA |
| Evaluation Example 2 | o | 100/100 | o | o | 0.37 mA |
| Evaluation Example 3 (for a reference) | o | 100/100 | o | o | 10.5 mA |
| Evaluation Example 4 (for a reference) | x | 40/100 | x | x | 0.52 mA |

Preparation of a panel for experiments: Solution was coated on an aluminum plate having the thickness of 0.30 mm with a barcoater so that a coating layer having 10 microns is formed.

The coating layer was baked for 3 minutes at 210° C. to prepare a panel for experiments, followed by being employed for respective experiments.

Storage stability of coatings

Water-based coatings were sealed up in glass-made bottles, followed by being stored at 50° C. in a thermostatically-controlled box, and outer appearances and properties before and after storing were periodically compared, respectively (for 1 month).

o: Storage stability is excellent.

x: Increase of viscosity, gelation, sedimentation, and separation, etc. was caused in storing.

Adhesion 11 cut lines are lengthwise and breadthwise formed with the interval of 1.5 mm with a cutter on the surface of coating layer in a panel for experiments to form cross-hatched lines. There is closely stuck a cellophane sticky tape having the width of 24 mm, followed by being strongly stripped.

Cross-hatched portions not stripped are shown as a numerator.

Water resistance

A panel for experiments is immersed at 125° C. for 60 minutes in water, and then the surface conditions of coating layer are visually observed.

o: quite unchanged

Δ: slightly changed x: remarkably changed

Corrosion resistance

There is treated a panel in which x-shaped cut lines are formed on the surface of coating layer with a cutter at 125° C. for 40 minutes in 1%-aqueous solution of edible salt, followed by being stored at 50° C. for 7 days to judge a corrosion state in the vicinity of the x-shaped lines.

o: quite uneroded

Δ: slightly eroded x: remarkably eroded

Processability

There was employed a Dupont impact strength tester which is a specializedly folding back type. Into the tester, there was set a panel for experiments which is acute-angledly bent by holding between two aluminum plates having the thickness of 0.30 mm. A weight having the weight of 1 kg in which contact surface is flat was dropped onto the bent portion from the height of 50 cm, and then voltage of 6.5 V was given for 10 seconds at a pointed end of the bent portion to measure an electric current value in the width having 20 mm in the pointed end of the bent portion.

As described hereinabove, the present invention can provide a high molecular weight epoxy resin having a sufficient concentration of epoxy groups and a nearly identical molecular weight compared to a phenoxy resin which has been conventionally employed, and a process for the preparation thereof.

We claim:

1. A process for the preparation of a high molecular weight epoxy resin having a weight average molecular weight of not less than 40,000 and an epoxy equivalent of not more than 10,000 g/eq and a molecular weight distribution (Mw/Mn) of <4, by thermally polymerizing an epoxy resin (A) and a divalent phenol (B) in a reaction solvent in the presence of a catalyst, wherein the catalyst is a salt of quaternary ammonium or an alkali metal compound and the mixing ratio by equivalent of said epoxy resin (A) with respect to said divalent phenol (B) is 1.10 to 1.03:1 based on an epoxy group/a phenolic hydroxyl group.

2. The process of claim 1 wherein the epoxy equivalent in the high molecular weight epoxy resin ranges from 4,000 g/eq to 10,000 g/eq.

3. The process of claim 1 wherein the epoxy resin (A) has an epoxy equivalent ranging from 100 g/eq to 1,000 g/eq.

4. The process of claim 1 wherein the divalent phenol (B) has a carbon number of 6 to 30.

5. The process of claim 4 wherein the divalent phenol (B) is bisphenol.

6. The process of claim 1 wherein the polymerization reaction is carried out at a temperature in the range of from 100 to 200° C.

7. The process of claim 6 wherein the polymerization reaction is carried out in a time period of from 3 to 12 hours.

8. The process of claim 5 wherein the polymerization reaction is carried out at temperatures in the range of from 120° C. to 200° C. and in a time period from 5 to 10 hours.

9. The process of claim 1 wherein the catalyst is selected from the group consisting of tetramethylammonium chloride, tetramethyl ammonium hydroxide and sodium hydroxide.

10. An epoxy resin, having a molecular weight of not less than 40,000, and an epoxy equivalent in the range of from 4,000 to 10,000 g/eq and a molecular weight distribution (Mw/Mn) of <4.

* * * * *